United States Patent
Corby, Jr. et al.

(10) Patent No.: US 6,515,258 B2
(45) Date of Patent: Feb. 4, 2003

(54) LONG REACH WELDING TORCH AND METHOD FOR SELECTING TORCH SHAPE

(75) Inventors: Nelson Raymond Corby, Jr., Scotia, NY (US); Pierino Gianni Bonanni, Clifton Park, NY (US); Ravi Rajamani, W. Hartford, CT (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/794,932

(22) Filed: Feb. 28, 2001

(65) Prior Publication Data

US 2002/0117487 A1 Aug. 29, 2002

(51) Int. Cl.$^7$ ................................................. B23K 9/00
(52) U.S. Cl. ................................ 219/125.1; 219/137 R; 901/42
(58) Field of Search ........................ 219/75, 125.1, 219/125.11, 125.12, 124.34, 130.01, 137 R; 901/42

(56) References Cited

U.S. PATENT DOCUMENTS

| | | | |
|---|---|---|---|
| 3,104,313 A | * 9/1963 | Rieppel | 219/125.1 |
| 4,296,308 A | * 10/1981 | Nakahama et al. | 219/125.1 |
| 4,333,001 A | * 6/1982 | Nakahama et al. | 219/125.1 |
| 4,581,518 A | * 4/1986 | Takahashi et al. | 219/130.01 |
| 4,647,749 A | * 3/1987 | Koshy | 219/125.12 |
| 4,851,639 A | * 7/1989 | Sugitani et al. | 219/124.34 |
| 6,096,994 A | * 8/2000 | Handa et al. | 901/42 |

* cited by examiner

Primary Examiner—Clifford C. Shaw
(74) Attorney, Agent, or Firm—Penny A. Clarke; Patrick K. Patnode

(57) ABSTRACT

Shape of a long reach device, e.g., a welding torch, suitable for use within a portion of an object along a joint curve, e.g., a weld joint, is determined by dissecting the long reach device into a discrete number of portions, identifying ranges of movement between each of the portions, and discretizing the ranges of movement into a predetermined number of intervals. A total number of possible shapes is determined based on the total portions of the long reach device having the first movement range discretized into a predetermined number of intervals. A representation of the long reach device having one of the possible shapes is compared with the representation of the portion of the object. A possible shape is deemed acceptable if less than a predetermined portion of the representation of the long reach device interferes with the representation

14 Claims, 5 Drawing Sheets

LONG REACH WELDING TORCH AND METHOD FOR SELECTING TORCH SHAPE

BACKGROUND OF THE INVENTION

This invention relates to a welding apparatus and method and, more particularly to a long reach welding torch suitable for welding irregularly shaped objects and a method for selecting shape of the torch.

Automation of welding processes by robotic devices is desirable generally to increase manufacturing efficiency including one or more welding steps. Gas tungsten arc welding (GTAW or TIG, i.e., tungsten inert gas welding) is often employed for automated or robotic welding because the electrode employed is nonconsumable. The robotic device, to properly perform the weld, must be either programmed or equipped with various sensors to automatically or semi-automatically guide the robotic device. This becomes particularly cumbersome where the workpieces have various three-dimensional shapes. Furthermore, these shapes sometimes have manufacturing tolerances. Additionally, the tip of the welding apparatus can become bent or otherwise transformed during use. To properly weld these shapes, a robotic welding device must be able to position the tip of the welding apparatus at a suitable distance and angle in relation to the joint to be welded.

Welding from the inside of a workpiece often requires that an access opening be cut in the workpiece to allow access to the interior. However, this is time consuming and requires that the access opening be closed when the welding from the inside is completed, which generally requires another welding operation.

Therefore, a need exists for a welding apparatus and method suitable for welding irregular shapes, and particularly for welding irregular shapes from the inside of a workpiece.

SUMMARY OF THE INVENTION

In a method for determining a shape for a long reach device, e.g., a torch, suitable for use within a portion of an object along a joint curve, e.g., a weld joint, the long reach device is dissected into a discrete number of portions. A first degree of freedom, e.g., in the azimuth direction, is identified between each of the portions, the first degree of freedom having a first movement range. The first movement range is discretized (or divided) into a predetermined number of intervals. A total number of possible shapes is determined, based on the total portions of the long reach device having the first movement range discretized into a predetermined number of intervals. A representation of the joint curve, including the portion of the object, is generated and a representation of the long reach device having one of the possible shapes is compared with the representation of the portion of the object. One of the possible shapes is deemed acceptable if less than a predetermined portion of the representation of the long reach device interferes with the representation of the portion of the object.

DETAILED DESCRIPTION OF THE INVENTION

An apparatus and method for welding an irregularly shaped object, particularly from the inside of such three-dimensional object, comprises a TIG welding apparatus robotically controlled, wherein the robotic control is by computer software that algorithmically determines an optimal path for the robotic motion. According to one embodiment of the invention, a particular shape for a welding apparatus is selected to minimize the degrees of freedom required for the robotic apparatus. The shape for the torch is selected generally according to the following procedure, to be described in further detail herein:

Dissect the torch into a discrete number of portions;

Identify one or more degrees of freedom between each of the portions;

Identify movement ranges for each degree of freedom;

Discretize each movement range into a predetermined number of intervals;

Determine total possible shapes based on the total number of torch portions and the total number of intervals;

Generate a representation of the weld curve, including the portion of the object;

Generate a representation of the torch and compare it to the representation of the weld curve including the portion of the object; and Accept one of the possible shapes if less than a predetermined portion of the representation of the torch interferes with the representation of the weld curve including the portion of the object.

Special problems arise when welding from the inside of a workpiece. Often, this is accomplished by cutting an access opening or slot in the workpiece. For example, and referring to FIG. 1, this welding process is conventionally used in welding a cover 12 to a series of impeller vanes 14. However, this is time consuming and requires that the access opening or slot thereafter be closed, which generally requires another welding step.

Figure 1:
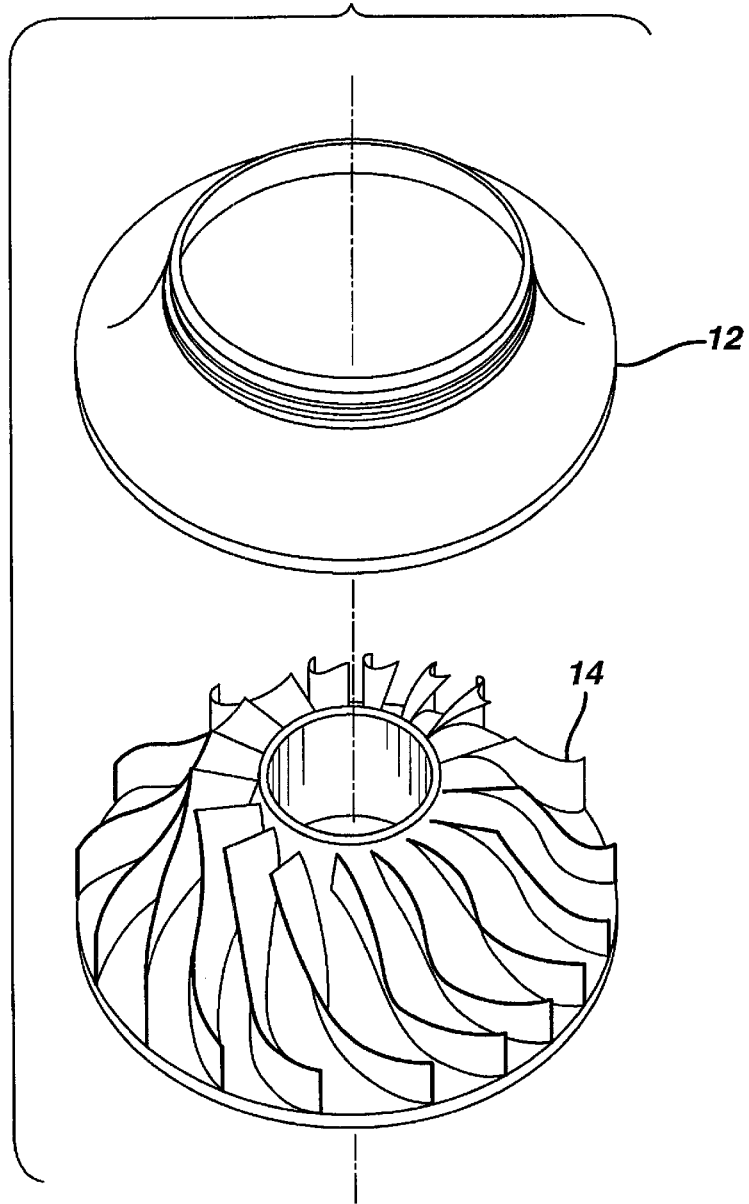
FIG. 1 is an exploded diagram of an impeller.
Figure 2:
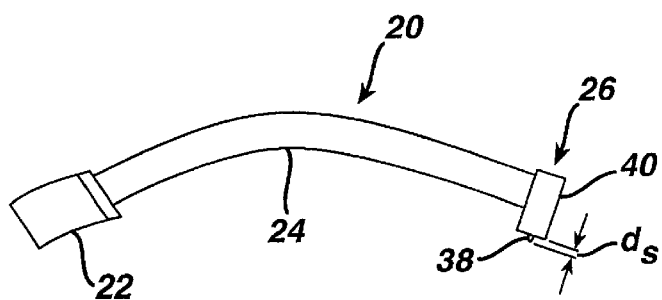
FIG. 2 is a side view of a welding torch.

FIG. 2 shows a welding torch 20 suitable for use as a long reach device. Torch 20 includes a collet 22 attached to a first end of a neck bundle 24. At a second end of neck bundle 24 is a welding tip 26 typically positioned at a right angle to the second end of the neck bundle. In the depicted embodiment, welding tip 26 is suitable for TIG welding. The dimensions of neck bundle 24, and any of the components thereof (described further herein), can vary depending on the size of the object to be welded, the quality of the weld desired, and the desired speed at which the object is to be welded. For example, in welding an object such as the impeller depicted in FIG. 1 which, for use in a gas turbine, may generally have a diameter between about 2 and about 5 feet (about 0.6096 and about 1.524 meters) and a metal thickness between about 0.25 and about 0.5 inches (about 6.35 and about 12.7 mm (millimeters). Neck bundle 24, shown in FIG. 2, is generally between about 6 and about 36 inches (about 15.24 and about 91.44 cm (centimeters), in length and between about 0.125 and about 1 inches (about 3.175 and about 25.4 mm) in diameter. Preferably, neck bundle 24 is between about 12 and about 24 inches (about 30.48 and about 60.96 cm) in length and between about 0.25 and about 0.75 inches (about 6.35 and about 19.05 mm) in diameter.

Figure 3:
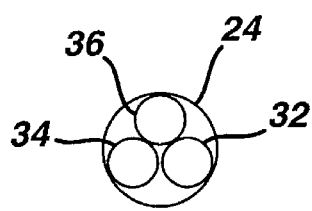
FIG. 3 is a sectional view of a welding torch neck.

As shown in FIG. 3, neck bundle 24 typically includes two liquid carrying tubes 32, 34 and a gas/electricity carrying tube 36, as is conventional. Typically, in TIG welding, liquid carrying tube 32 provides water flow to welding tip 26 and liquid carrying tube 34 returns water flow from welding tip 26. In accordance with one embodiment, the components of neck bundle 24 are formed of a malleable material, such as copper or brass, suitable to carry the fluids within the respective tubes.

Figure 4:
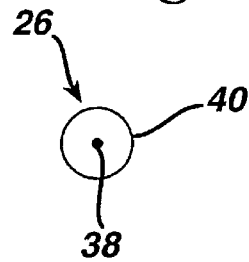
FIG. 4 is a front view of a welding torch tip.

As shown in FIG. 4, welding tip 26 comprises an electrode 38 coaxially surrounded by a gas shield 40. The materials, dimensions, and configuration of electrode 38 can vary as is known by those skilled in the art. Generally, electrode 38 is tungsten or another nonconsumable material which generally extends between about 0.0625 and about 0.375 inches (about 1.5875 and about 9.525 mm) in length beyond the end of gas shield 40 (as shown in FIG. 2 as distance "$d_s$"), and is between about 0.0625 and about 0.125 inches (about 1.5875 and about 3.175 mm) in diameter (thickness). Preferably, electrode 38 extends a distance $d_s$ between about 0.1 and about 0.15 inches (about 2.54 and about 3.81 mm) and is between about 0.09 and about 0.11 inches (about 2.286 and about 2.794 mm) in diameter (thickness). In other preferred embodiments, distance $d_s$ is approximately equal to the electrode diameter. Furthermore, the materials, dimensions, and configuration of shield 40 can vary as is known by those skilled in the art. Generally gas shield 40 is a ceramic material in a cylindrical configuration between about 0.25 and about 1 inch (about 6.35 and about 25.4 mm) in length and between about 0.25 and about 1 inch (about 6.35 and about 25.4 mm) in outside diameter, having a wall thickness between about 0.05 and about 0.07 inches (about 1.27 and about 1.778 mm). Preferably, shield 40 is between about 0.375 and about 0.625 inches (about 9.525 and about 15.875 mm) in length and between about 0.375 and about 0.625 inches (about 9.525 and about 15.875 mm) in outside diameter.

Figure 5:
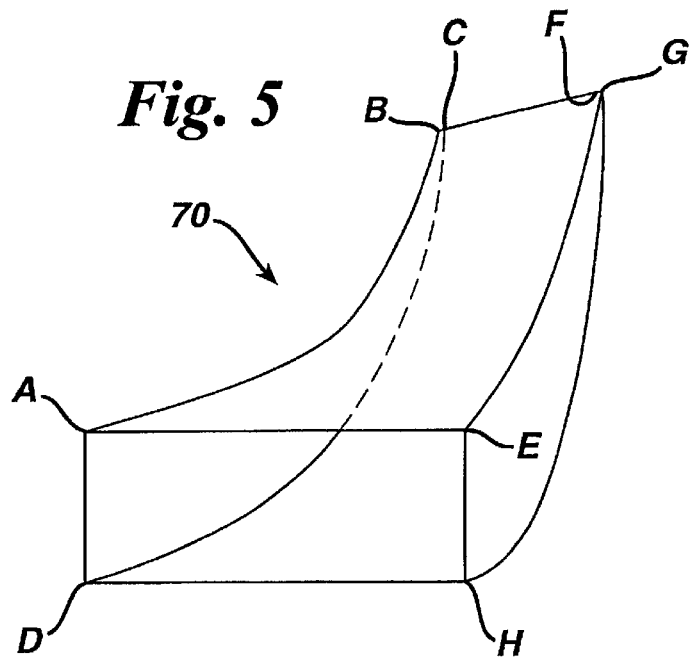
FIG. 5 is a sectional view of an object which is to be welded from the inside thereof.

FIG. 5 is a schematic diagram of an irregularly shaped object 70, which, in one embodiment, is a portion of an impeller between a pair of upstanding vanes (e.g., as shown generally in FIG. 1). Conventionally, an object (e.g., a blade of an impeller) is welded to the inside surface of object 70 from the outside through suitable slots aligning with the weld joint. Another approach is to manipulate the welding apparatus with a robotic arm in such a manner as to reach the weld joint from an opening within object 70. Conventionally, such an approach requires many degrees of freedom for the robotic arm and/or the welding apparatus (e.g., between about 6 and about 12 degrees of freedom), since the robotic arm/welding apparatus combination must move in a snakelike manner to maintain the welding tip at a suitable distance from, and angle with, the weld joint.

Figure 6:
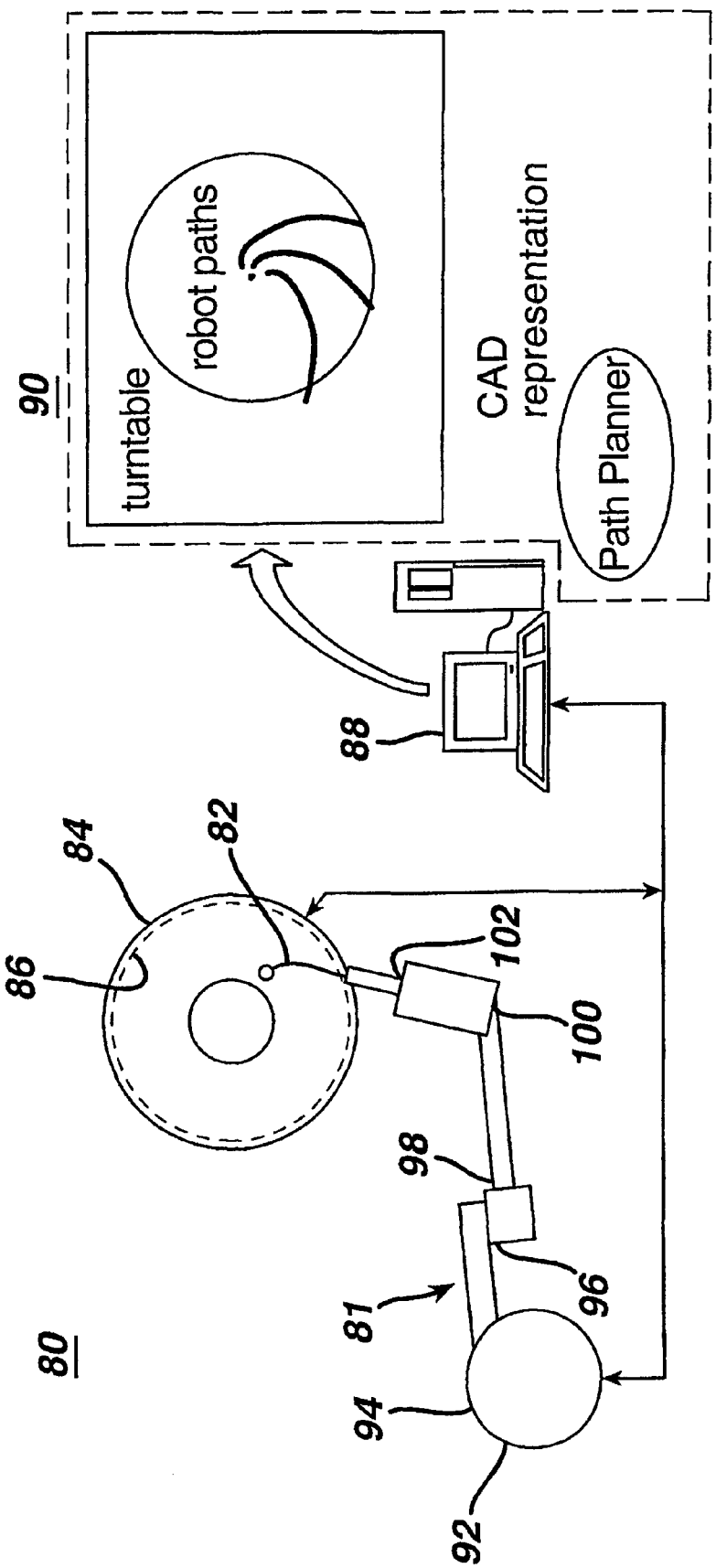
FIG. 6 is a schematic illustration of a robotic system for welding an object.

In FIG. 6, a computer-controlled robotic welding system 80 is schematically depicted. A robot 81 carrying a torch 82 is generally positioned to weld one or more joints on an object 84. In one exemplary embodiment, object 84 may be an impeller, with a plurality of objects 70 (FIG. 5) in radial arrangement forming a bell shaped object similar to that described above with respect to FIG. 1.

Object 84 is situated on a positioner 86 (shown by dashed lines). The dimensions, configuration, and degrees of freedom of positioner 86 can vary as is known by those skilled in the art. Generally, positioner 86 may be a conventional turntable with two degrees of freedom, suitable for rotational movement and/or tilt movement.

Robot 81 and object 84 are controlled by a computer 88 employing a software system via a suitable interface which includes a conventional robot control. Further, positioner 86 can additionally be interfaced through a conventional positioner control.

Computer 88 constitutes any suitable electronic device capable of accepting data and instructions, executing the instructions to process the data, and presenting the results, while software system 90 typically includes various conventional aspects such as object modeling and path planning. Generally, the object modeling is effectuated by a program package such as a computer-aided-design (CAD) package, and the path planning software is capable of determining weld paths from the object model.

Using the program package, a representation of an object, such as object 84, is generated. Further, a representation of torch 82 can be modeled. A path for torch 82 through object 84 can therefore be modeled using the program package. One way that such modeling may be accomplished is to position a three dimensional representation of torch 82 such that its tip is at a suitable position and angle within object 84 at one end point of the joint to be welded. The three dimensional representation of torch 82 is incrementally repositioned to another location relative to the weld joint generally in a direction toward the opposite end of the weld joint within object 84. The incremental repositioning represents movement at a predetermined incremental distance. Any movement in a direction consistent with the robotic capabilities and available mechanical degrees of freedom is possible. Using this method, it is possible to determine whether or not, and at what positions and/or orientations, the path of torch 82 causes contact or other interference with one or more surfaces of object 84.

Contact with object 84 can be minimized or eliminated with the provision of a robot having many degrees of freedom (e.g., having a neck with snake-like movement capabilities). However, in certain embodiments, where the torch neck has very few or zero degrees of freedom, the number of degrees of freedom are based on robotic movement aside from the torch neck. In one embodiment, robot 80 in FIG. 6 has up to six degrees of freedom: shoulder twist 92, shoulder elevate 94, joint elevate 96, joint twist 98, joint elevate 100, and joint twist 102.

In certain situations, a determination is made as to whether or not the electrode and/or electrode shield of torch 82 contact one or more surfaces of object 84 while moving along the welding path as modeled. Electrode contact is generally undesirable, as it may lead to degradation of the electrode and burning of one or more surfaces of object 84. Additionally, electrode shield contact may cause breakage of the shield, resulting in oxidation of the electrode, weld pool, and/or the surrounding metal. Further, electrode shield contact may result in marring of one or more surfaces of object 84. Therefore, in one preferred embodiment, torch 82 is shaped such that the torch electrode does not contact object surfaces during welding. According to another preferred embodiment, torch 82 is shaped such that neither the torch electrode nor the electrode shield contact object surfaces during welding. In yet another preferred embodiment, torch 82 is shaped such that the torch electrode and the electrode shield do not contact the object surfaces, and the torch neck minimally touches the object surfaces during welding. In still another preferred embodiment, torch 82 is shaped such that no part thereof touches the object surfaces during welding. The particular torch shape depends generally on the desired amount of clearance between torch 82 and the interior of the object. Further embodiments include a torch having the aforementioned torch shape parameters and employing a robot having minimal degrees of freedom, preferably no more than 10 degrees of freedom, and more preferably no more than 6 degrees of freedom.

The torch shape can be determined by trial and error. For example, a particular shape can be represented with the program package. The welding path can then be modeled as described above, with movement limited in accordance with predetermined robot degrees of freedom.

Figure 7:
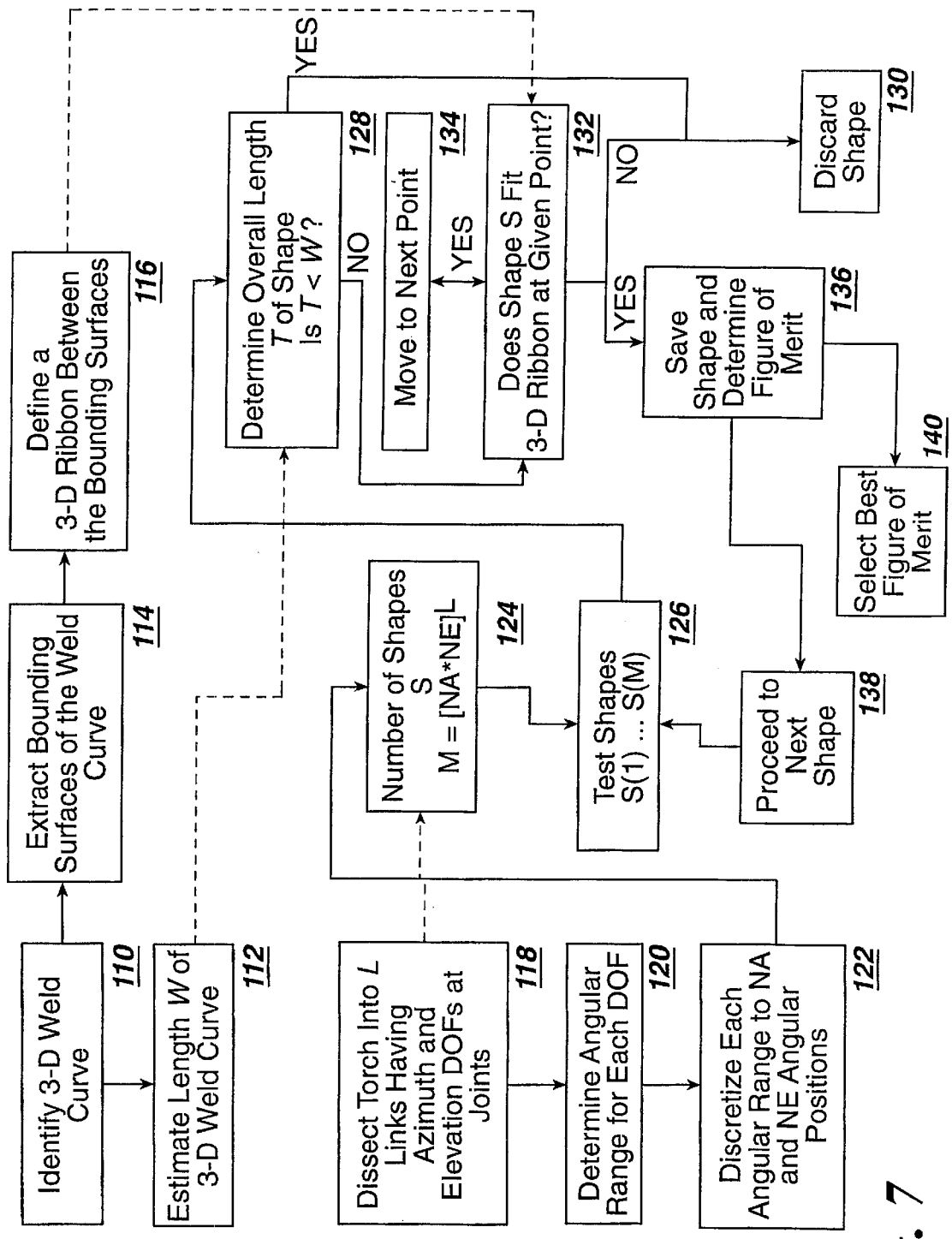
FIG. 7 is a flow diagram of an algorithm suitable for determining the shape of a welding torch.

In one embodiment, an algorithm determines one or more suitable and/or optimal torch shapes. FIG. 7 is a flow chart of one such algorithm suitable for determining shapes for torch 82. Certain shapes of torch 82, herein referred to as torch shapes, allow for more fluent traverse through object 84 by use of computer 88 (shown in FIG. 6) to control the motion of robot 81 (shown in FIG. 6.). The algorithm presented in FIG. 7 is provided in computer instructions written as software to be executed in computer 88. The software can be encoded in any appropriate computer language. The software can also be encoded directly on an integrated circuit, as for example, an ASIC (application specific integrated circuit). Additionally, an operator may use an existing software application such as a spreadsheet or database and correlate various cells with the variables enumerated in the algorithms. Furthermore, the software can be independent of other software or dependent upon other software, such as in the form of integrated software. Preferably, the algorithm is programmed with C, C++, Java, or a derivative thereof. Such languages can readily communicate with various software packages such as low level hardware control software and higher level CAD packages and path planning software.

In FIG. 7, the algorithm generally commences at step 110 by identifying the three-dimensional weld curve, typically by a CAD package. For example, object 70, depicted in FIG. 5 as a portion of the impeller shown in FIG. 1, represents an object to be welded from the inside of the impeller and is bounded by points A, B, C, D, E, F, G, and H. Thus one three-dimensional weld curve is between points A and B, and another three-dimensional weld curve is between points E and F. Therefore, at step 110 of FIG. 7, the weld curve A-B (i.e., between points A and B) and the weld curve E-F (i.e., between points E and F) are independently identified.

Figure 8:
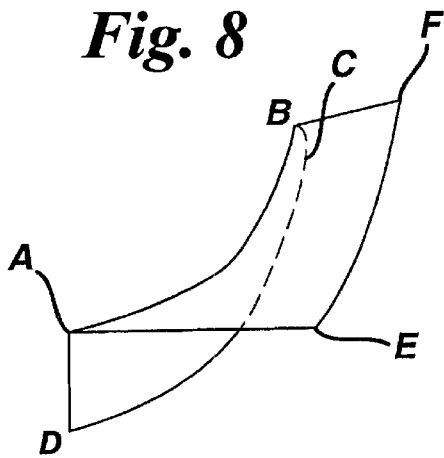
FIG. 8 is a step in the algorithm described with respect to FIG. 7.
Figure 9:
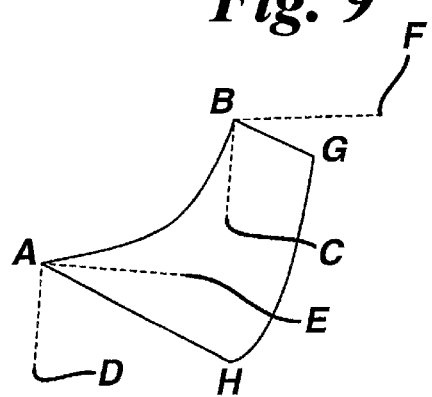
FIG. 9 is another step in the algorithm described with respect to FIG. 7.

At step 112, a length of each of the three-dimensional weld curves identified at step 110 is estimated. Also, at step 114, the bounding surfaces of the three-dimensional weld curve identified at step 110 are extracted. These extracted bounding surfaces are illustrated in FIG. 8, wherein weld curve A-B is bounded by one planar surface A-B-F-E, and by another planar surface A-B-C-D. At step 116, a three-dimensional ribbon between the bounding surfaces (A-B-F-E and A-B-C-D) is defined. FIG. 9, illustrates one example of such a three-dimensional ribbon between planar surfaces A-B-F-E and A-B-C-D of object 70. The ribbon is created by bisecting planar surfaces A-B-F-E and A-B-C-D. Thus if object 70 is, for example, a rectangle, the ribbon is a diagonal plane from the weld curve to the opposite edge (e.g., edge H-G using the identifiers of FIG. 5). However, where object 70 is irregularly shaped, as shown in FIG. 5, the ribbon generally may include rising and twisting features because the angle between the bounding surfaces varies. Such a ribbon is defined by a surface A-B-G-H as shown in FIG. 9.

In FIG. 7, selection of torch shapes begins at step 118, where a torch having an initial extended length is dissected into L links. Between each pair of adjacent links, two degrees of freedom are provided: azimuth and elevation. Next, at step 120, an angular range for each degree of freedom is determined. The angular range for each degree of freedom can vary as will be apparent to those skilled in the art. Alternatively, fewer degrees of freedom can be provided between each pair of adjacent links.

Generally the angular range for each degree of freedom is between about −60 degrees and about +60 degrees for both the azimuth degree of freedom and the elevation degree of freedom. Preferably, the angular range for each degree of freedom is between about −15 and about +15 degrees. More preferably, the angular range for each degree of freedom between about −10 and about +10 degrees.

At step 122 the angular ranges are segmented into a predetermined number of intervals, or discretized. The intervals for the angular ranges can vary; generally the lowest desired number of intervals is 2, while the highest number of intervals depends on various factors including, but not limited to, the total number of links, the shape of the object to be welded, and the required response time for calculation performance (which is also influenced by the speed of computer 88, the software employed, and the algorithm employed). Preferably, between about 3 and 5 intervals for each degree of freedom (i.e. the azimuth angular range and the elevation angular range) are provided. As a result, a number NA of angular positions in the azimuth direction and a number NE of angular positions in the elevation direction are set. At step 124, the total possible number M of shapes S are determined according to the equation:

$$M = [NA * NE]^L.$$

An array of shapes S (1) through S (M) are noted at step 126. These shapes are tested in the following manner to determine whether or not the particular shape is suitable for use as a torch when welding from the interior of an object having the three-dimensional weld curve identified at step 110. First, at step 128, an overall length T of each shape is determined. This length T is measured as a linear distance from one end of the shape to the opposite end of the shape, and is generally a different value than the extended length of the torch (except, of course, when the values for each of the angular positions is zero) due to the various angles. The length T is then compared against the estimated length W of the three-dimensional weld curve as determined at step 112. If T is less than W, then at step 130 that particular shape is immediately discarded, since it will not reach the furthest interior point of the three-dimensional weld curve identified at step 110. Conversely, if T is not less than W, then that particular shape remains a candidate since, at the very least, it will reach the furthest interior point of the three-dimensional weld curve identified at step 110.

Next, at step 132 a representation of a particular torch shape is aligned with a representation of the object relative to a certain weld point on the three-dimensional weld curve identified at step 110 such that the torch tip is aligned using the program package described above. The representation of the object includes a torch entry opening, so that the torch must fit within the opening and reach the most distant point from that opening. Additionally, the torch tip should be suitably positioned for welding as described above. Suitable positioning of the torch tip is determined herein by comparing the tip position to the three-dimensional ribbon defined at step 116 and allowing an amount of tolerance which depends upon the angle between the three-dimensional ribbon and one or both of the extracted banding surfaces of the weld curve, the dimensions of the torch tip, and other considerations.

With a torch tip representation initially in a suitable position at a point on the weld curve furthest from the torch entry opening, the remainder of the shape (e.g., the torch neck) is checked to determine whether or not contact is made with the surface of the representation of the object. If there is interference between any part of the torch shape and the interior of the object, that particular shape is discarded step 130. Conversely, if there is no interference between the torch shape and the object, the torch tip representation is moved, at step 134, to a point on the weld curve closer to the torch entry opening. This movement is typically incremental and in a direction consistent with the capabilities (i.e., degrees of freedom) of the robot used to move the torch. Again, with the torch tip representation in a suitable position, the remainder of the torch shape is checked to determine whether or not contact is made with the object. This process is continued until interference is found between the torch shape and the object, in which event the shape is discarded (at step 130), or until no interference is found between the torch shape and the object, in which event, at step 136, the shape is saved.

At step 136, a figure of merit, which relates to the desirability of the torch shape within the particular weld curve, is determined. In one exemplary embodiment, a figure of merit is determined by using a safety zone around the torch shape. At step 132, when no interference is found when the torch tip is aligned at a certain point on the weld curve between the torch shape and the object, a distance envelope (a volumetric value) is determined between the shape and the object surfaces. Larger distance envelopes generally denote more desirable torch shapes, since a larger safety zone is provided for. To provide a figure of merit for the particular shape, the distance envelopes are summed across the entire range of points on the weld curve with which the torch tip is aligned. The figure of merit, which increases as the safety zone increases, is then saved alongside the particular shape at step 136.

In another exemplary embodiment, a figure of merit is determined by using a safety distance between the torch shape and the object surface. At step 132, when no interference is found when the torch tip is aligned at a certain point on the weld curve between the torch shape and the object, the smallest linear distance between the shape and the object surfaces is determined. To provide a figure of merit for the torch shape, the distances are summed across the entire range of points on the weld curve with which the torch tip is aligned. At step 136, the figure of merit is again saved alongside the torch shape.

Once a particular torch shape has been saved and a figure of merit assigned, the algorithm proceeds to step 138, moving on to test the next shape at step 126. This procedure continues until all M shapes have been either eliminated or assigned a figure of merit, at which time, at step 140, the shape having the best figure of merit is selected.

The technique described above with respect to FIG. 7 can further enhance torch shape selection by providing a second weld curve to be identified at step 110 after completing analysis of the first weld curve. Generally, a second weld curve is to be identified, and the selection of the best figure of merit at step 140 is skipped, leaving the array of shapes and corresponding figures of merit relative to the first weld curve at step 136. These shapes can be substituted for the array of shapes at step 126.

The second three-dimensional weld curve is identified at step 110, the weld curve length W is estimated at step 112, the bounding surfaces of the weld curve are extracted at step 114, and a three-dimensional ribbon between the bounding surfaces is defined at step 116. At step 128, a shape length T is determined for a torch shape obtained following step 126 (i.e., those torch shapes saved at step 136 after analysis of the first three-dimensional weld curve) and compared to W as described above. If T is less than W, that particular torch shape is discarded at step 130. If T is not less than W, that torch shape is then paired with the three-dimensional ribbon for the second three-dimensional weld curve as described above, and determinations are made as to existence of any interference between the torch shape representation and the object surface, as described above with respect to steps 132 and 134. Acceptable shapes are again stored as represented at step 136, and appropriate figures of merit are determined.

After completion of the analysis for the first and second three-dimensional weld curves, then at step 136 any remaining shape has been determined to be suitable for use with both the first and second three-dimensional weld curves. If a plurality of shapes remain, a shape can be selected, for example, based on the sum of the figures of merit for the first and second three-dimensional weld curves.

The analysis continues further for additional weld curves. Ideally, a shape will be selected that is suitable for a plurality of weld curves.

Of course, it will be apparent to one skilled in the art that the algorithm described with respect to FIG. 7 can readily be modified. For example, instead of the figure of merit approach, the analysis can proceed to use the first acceptable shape. Alternatively, all acceptable shapes can be saved for a first curve. Then, in a second cycle, those shapes can be analyzed for a second curve, and in a third cycle the remaining usable shapes can be analyzed for a third curve, and so on, until one or more shapes remain; that is, if zero shapes remain after the second or a subsequent cycle, the previous shape or group of shapes can be used as the resultant shape.

One benefit of the figure of merit approach is the added degree of space for torch shapes having a high figure of merit. For example, an object may have variances in its curve shape although manufactured according to certain specifications. These variances can be due to factors such as normal manufacturing tolerances and thermal deformation.

When a particular torch shape is found acceptable, that shape is physically replicated. Typically, the shape is replicated using a conventional bending machine. Alternatively, a torch neck can be manufactured with a plurality of links having appropriate movement relative to each other, for example, similar to that modeled above and discussed with respect to steps 118, 120 and 122, such that the torch neck can be shaped manually or with a separate robot or robotic movement. In yet another alternative embodiment, the torch neck comprises a plurality of links having tendons and/or cables therebetween electronically linked to a robotic apparatus via control wires (e.g., one wire for each tendon and/or cable wherein three tendons and/or cables are attached to each link), wherein the torch is "self shaping" by appropriate manipulation of the tendons and/or cables via the control wires.

During welding operation, described generally above with respect to FIG. 6, the shaped torch selected can be one that minimizes the degrees of freedom required for robot 81. Where a particular shape is acceptable for one or more curves, robot 81 can be programmed to weld the one or more curves with that particular torch shape and to thereafter change the torch shape for the next curve or group of curves. The torch shape can be changed by replacing the particular torch with another shaped torch, or the particular shape of the torch itself can be varied as described above.

The torch described above generally with respect to FIGS. 2–4 is employed for TIG welding without a filler metal, wherein the parent metal is used to form the joint (as is conventionally known). In another welding torch embodiment, filler metal is employed, for example, to enhance the structural integrity of the weld joint. The weld joint generally can have various fillet shapes and dimensions which are dependent on factors such as strain loads, shear loads, torsional stress, thermal exposure, and any combination of at least one of the foregoing factors.

Figure 10:
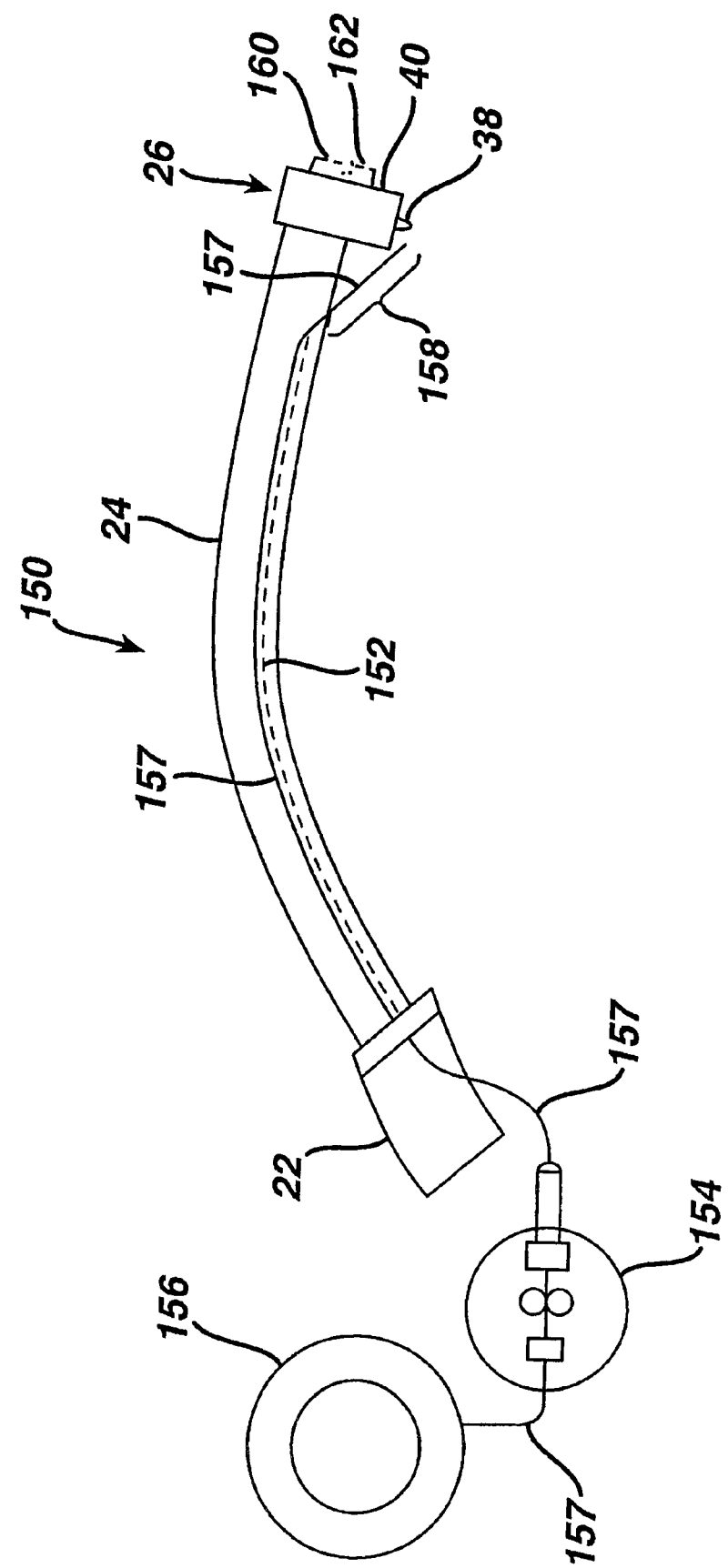
FIG. 10 is a side view of an alternative welding torch.

FIG. 10 illustrates a torch 150 including components described with respect to FIGS. 2–4, specifically collet 22 attached to one end of neck bundle 24, and welding tip 26 attached to the opposite end of neck bundle 24, wherein welding tip 26 comprises electrode 38 and gas shield 40. Additionally, torch 150 comprises a filler support 152 in mechanical communication with a feeder 154 receiving filler 157 in the form of wire from a filler source 156. At welding tip 26, filler support 152 is configured such that a portion 158 of the filler wire bends away from neck 24 to a position suitable for welding. The materials and configuration of filler support 152, feeder 154, filler source 156, and filler wire 157 can vary as is known by those skilled in the art. Generally, the filler wire starts to bend away from neck bundle 24 at a distance from welding tip 26 between about 0 and about 4 inches (about 0 and about 10.16 cm), terminates such that the end of the filler wire is between about 0 and about 0.75 inches (about 0 and about 19.05 mm) from the tip of electrode 38, and has a diameter between about 0.0010 and about 0.0050 inches (about 0.0254 and about 0.127 mm). Preferably, the filler wire starts to bend away from neck bundle 24 at a distance from welding tip 26 between about 1 and about 2 inches (about 2.54 and about 5.08 cm) from the tip of electrode 38, terminates such that the end of the filler wire is between about 0.125 and about 0.375 inches (about 3.175 and about 9.525 mm) from the tip of electrode 38, and has a diameter between about 0.0020 and about 0.0030 inches (about 0.0508 and about 0.0762 mm).

With the inclusion of the filler wire and portion 158, the above-described algorithm (as represented in FIG. 7) for determining one or more suitable shapes for the torch applies with little modification. Generally, the shape of portion 158 remains constant, since the distance and angle relative to electrode 38 are preferably constant to maintain the weld integrity, and thus the number of shapes (as determined in FIG. 7 at step 124) remains the same. The main difference in implementing the algorithm lies in the modeling described generally with respect to step 132 of FIG. 7, wherein filler wire portion 158 would be included in the three dimensional representation of the torch. However, it is also contemplated that additional shapes can be determined based on filler wire portion 158, wherein portion 158 would be dissected and discretized generally in the manner as described with respect to steps 118, 120, and 122 of FIG. 7.

A weld pool is generated at the weld joint on the weld curve, wherein it is often desired to maintain the weld pool at suitable angles by positioning the torch tip. This is typically accomplished by movement of robot 81 and positioner 86 (FIG. 6). Where one or more shapes are determined without regard to the weld pool orientation, the shape or shapes can nonetheless be employed when the weld pool orientation is accounted for. This is accomplished by synchronously moving robot 81 and positioner 86. In one preferred embodiment, the weld pool orientation is no greater than 80 degrees from the horizontal position. In a more preferred embodiment, the weld pool orientation is no greater than 30 degrees from the horizontal position. In a most preferred embodiment, the weld pool orientation is no greater than 10 degrees from the horizontal position.

In another exemplary embodiment, one or more guide devices 160 (indicated schematically in FIG. 10 with dashed lines) are attached to welding tip 26 to help guide the torch along a joint. Guide device 160 may be used in conjunction with a computer controlled system, for example, to account for variances due to factors such as normal manufacturing tolerances and thermal deformation. In the prior art, these variances are not accounted for in the programmed robot movement, even in the most robust three dimensional curve representations.

Guide device 160 can be any of a variety of passive guides, active guides, or a combination of such guides. Passive guides may include, for example, rollers, ball bearings, feelers, whiskers, V-shaped blocks, or any combination thereof. Active guides include, for example, capacitive pickups, linear variable-differential transformers, lasers, optical sensors, or any combination thereof.

In still another exemplary embodiment, an image pickup device 162 (indicated schematically in FIG. 10 with dashed lines) can be included to provide an image of aspects such as the torch tip, the electrode, the filler wire, the weld, the weld pool, or any combination thereof. The image pickup device can be, for instance, a miniature video camera chip with an appropriate optical transmission system or passive transmission system (such as coherent optical fiber bundles or optical relay systems). The image from such a device may be used by a human operator in controlling the path and parameters (e.g., fluid flow, filler rate, electricity flow) of the torch, or may be used by an automated system to provide data to alter the robot and/or positioner trajectory or the torch welding parameters. The image pickup device can be located, for example, at the position of guide device 160 on welding tip 26, or closer to electrode 38. The image pickup device can be used alone, or in conjunction with a guide device.

Although the foregoing description sets forth a method and apparatus relating to TIG welding, or other nonconsumable welding, it is contemplated that the invention may also apply to consumable welding. Furthermore, the novel method and apparatus described generally herein can be readily employed to determine one or more shapes of apparatus for other long reach applications such as cutting torches, etching devices, water cutting tools, grit cutting tools, and cleaning tools.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for determining and physically replicating a shape for a long reach device having a length suitable for use within a portion of an object along a joint curve, said method comprising:
   (a) dissecting said long reach device into number of portions L;
   (b) assigning a first degree of freedom having a first movement range between each of said L portions;
   (c) discretizing said first movement range into a predetermined number of intervals;

(d) determining a total number of shapes M based on said L portions having said first movement range;

(e) generating a representation of the joint curve including the portion of the object;

(f) comparing a representation of said long reach device having one of said M shapes with said representation of the portion of the object, wherein said one of said M shapes is deemed acceptable if less than a predetermined portion of said representation of said long reach device interferes with said representation of the portion of the object; and (g) physically replicating the shape determined by steps (a)–(f).

2. The method as in claim 1, wherein if said one of said M shapes is not deemed acceptable, then further comprising;

(h) comparing a representation of said long reach device having another of said M shapes with said representation of the portion of the object, wherein said another one of said M shapes is deemed acceptable if less than said predetermined portion of said representation of said long reach device having said another of said M shapes interferes with said representation of the portion of the object, and wherein said physical replication is of the shape determined by steps (a)–(f) and (h).

3. The method as in claim 1, further comprising:

(h) assigning a second degree of freedom having a second movement range between each of said L portions of said long reach device; and (i) discretizing said second movement range into a predetermined number of intervals, wherein said physical replication is of the shape determined by steps (a)–(f), (h), and (i).

4. The method as in claim 1, wherein said first degree of freedom is in an azimuth direction and said first movement range is discretized into NA intervals and said second degree of freedom is in an elevation direction and said second movement range is discretized into NE intervals.

5. The method as in claim 4, wherein said total number of shapes M is determined by the equation:

$$M=[NA*NE]^L.$$

6. The method as in claim 1, wherein said representation of said long reach device includes a representation of a filler wire.

7. A welding system comprising:

a robot having a long reach device depending from a portion of said robot, said long reach device comprising a welding torch including a welding tip;

a software system comprising a path planning program and a torch shape program, said torch shape program being configured to determine a shape of said torch according to steps (a)–(f) of claim 1; and a computer interfacing said robot for controlling said robot, said computer being configured to employ said software system, including running said path planning program, wherein said torch has a shape determined by said computer employing said torch shape program.

8. The welding system as in claim 7, wherein said robot has up to 6 degrees of freedom.

9. The welding system as in claim 7, further comprising:

a positioner for supporting and positioning said object, said computer interfacing with said positioner for controlling said positioner.

10. The welding system as in claim 9, wherein said robot has up to 6 degrees of freedom and said positioner has 2 degrees of freedom.

11. The welding system as in claim 7, further comprising at least one of a group consisting of a torch guide device attached to said welding tip and an image pickup device attached to said welding tip.

12. A method for determining and physically replicating a shape of a long reach device having a length suitable for use within a portion of an object along a joint curve comprising the steps of:

(a) dissecting said long reach device into a number of portions L;

(b) assigning an azimuth degree of freedom having an azimuth movement range between each of said L portions and an elevation degree of freedom having an elevation movement range between each of said L portions of said long reach device;

(c) discretizing said azimuth movement range into NA intervals and said elevation movement range into NE intervals;

(d) determining a total number of shapes M based on said L portions by the equation:

$$M=[NA*NE]^L;$$

(e) generating a representation of the joint curve including said portion of said object;

(f) comparing with said representation of said portion of the object, a first representation of said long reach device having one of said M shapes, wherein said one of said M shapes is deemed acceptable if less than a predetermined portion of said representation of said long reach device interferes with said representation of said portion of the object and is deemed unacceptable if more than a predetermined portion of said representation of said long reach device interferes with said representation of said portion of the object;

(g) comparing with said representation of said portion of the object, a second representation of said long reach device having another of said M shapes if said first representation is deemed unacceptable, wherein the step of comparing with said representation of said-portion of the object continues for subsequent representations of said long reach device having other of said M shapes until at least one acceptable representation of said long reach device is determined; and (h) physically replicating the shape determined by steps (a)–(g).

13. The method as in claim 12, further comprising:

(i) assigning a figure of merit to an acceptable representation of said long reach device, wherein said figure of merit is based on an average distance between said acceptable representation of said long reach device and said representation of said portion of the object, wherein said physical replication is of the shape determined by steps (a)–(g) and (i).

14. The method of claim 12, wherein in step (g), the step of comparing with said representation of said portion of the object continues for subsequent representations of said long reach device having other of said M shapes until all representations of said long reach device having M shapes have been compared to said representation of said portion of the object.

* * * * *